United States Patent
Tange et al.

[11] Patent Number: 6,161,073
[45] Date of Patent: Dec. 12, 2000

[54] APPARATUS AND METHOD FOR PERFORMING AUTOMATIC CONTROL OVER VELOCITY OF AUTOMOTIVE VEHICLE

[75] Inventors: Satoshi Tange, Yokohama; Kenichi Egawa, Tokyo, both of Japan

[73] Assignee: Nissan Motor Co., Ltd., Yokohama, Japan

[21] Appl. No.: 09/280,566

[22] Filed: Mar. 30, 1999

[30] Foreign Application Priority Data

Mar. 30, 1998 [JP] Japan .................................. 10-084359

[51] Int. Cl.[7] .................................................. B60K 31/00
[52] U.S. Cl. ............................ 701/96; 342/455; 342/458; 340/435
[58] Field of Search .............................. 701/96, 110, 70, 701/79; 180/170; 342/455, 458; 340/435

[56] References Cited

U.S. PATENT DOCUMENTS

| | | | |
|---|---|---|---|
| 3,952,301 | 4/1976 | Sorkin | 342/71 |
| 5,053,979 | 10/1991 | Etoh | 364/528.39 |
| 5,124,923 | 6/1992 | Takahashi | 701/96 |
| 5,141,294 | 8/1992 | Zanten et al. | 303/182 |
| 5,173,859 | 12/1992 | Deering | 701/70 |
| 5,197,562 | 3/1993 | Kakinami et al. | 180/169 |
| 5,396,426 | 3/1995 | Hibino et al. . | |
| 5,454,442 | 10/1995 | Labuhn et al. | 180/169 |
| 5,675,518 | 10/1997 | Kuroda et al. . | |
| 5,749,063 | 5/1998 | Sakonjyu et al. | 701/93 |
| 5,752,214 | 5/1998 | Minowa et al. | 701/111 |
| 5,850,176 | 12/1998 | Kinoshita et al. | 340/435 |
| 5,904,215 | 5/1999 | Ikeda | 180/169 |
| 5,934,399 | 8/1999 | Iiboshi et al. | 180/169 |
| 5,955,941 | 9/1999 | Pruksch et al. | 340/435 |
| 6,006,144 | 12/1999 | Takahashi et al. | 701/1 |

Primary Examiner—William A. Cuchlinski, Jr.
Assistant Examiner—Olga Hernandez
Attorney, Agent, or Firm—Foley & Lardner

[57] ABSTRACT

In apparatus and method for performing an automatic vehicular velocity control for an automotive vehicle, a vehicular running control such that the vehicle follows up a preceding vehicle running ahead of the vehicle maintaining an inter-vehicle distance to the preceding vehicle at a predetermined inter-vehicle distance and that a vehicular velocity variation rate is maintained at a set target vehicular velocity variation rate is effected and, when the detected vehicular velocity becomes equal to or lower than a set vehicular velocity above which the vehicular velocity control by the vehicular running controller is effected, the vehicular running control effected as described above is released and a rate of variation with time in a vehicular target acceleration/deceleration set when the control is released is moderated. In addition, an alarm unit is, provided for informing a vehicular driver of the release of control over the vehicular velocity.

19 Claims, 8 Drawing Sheets

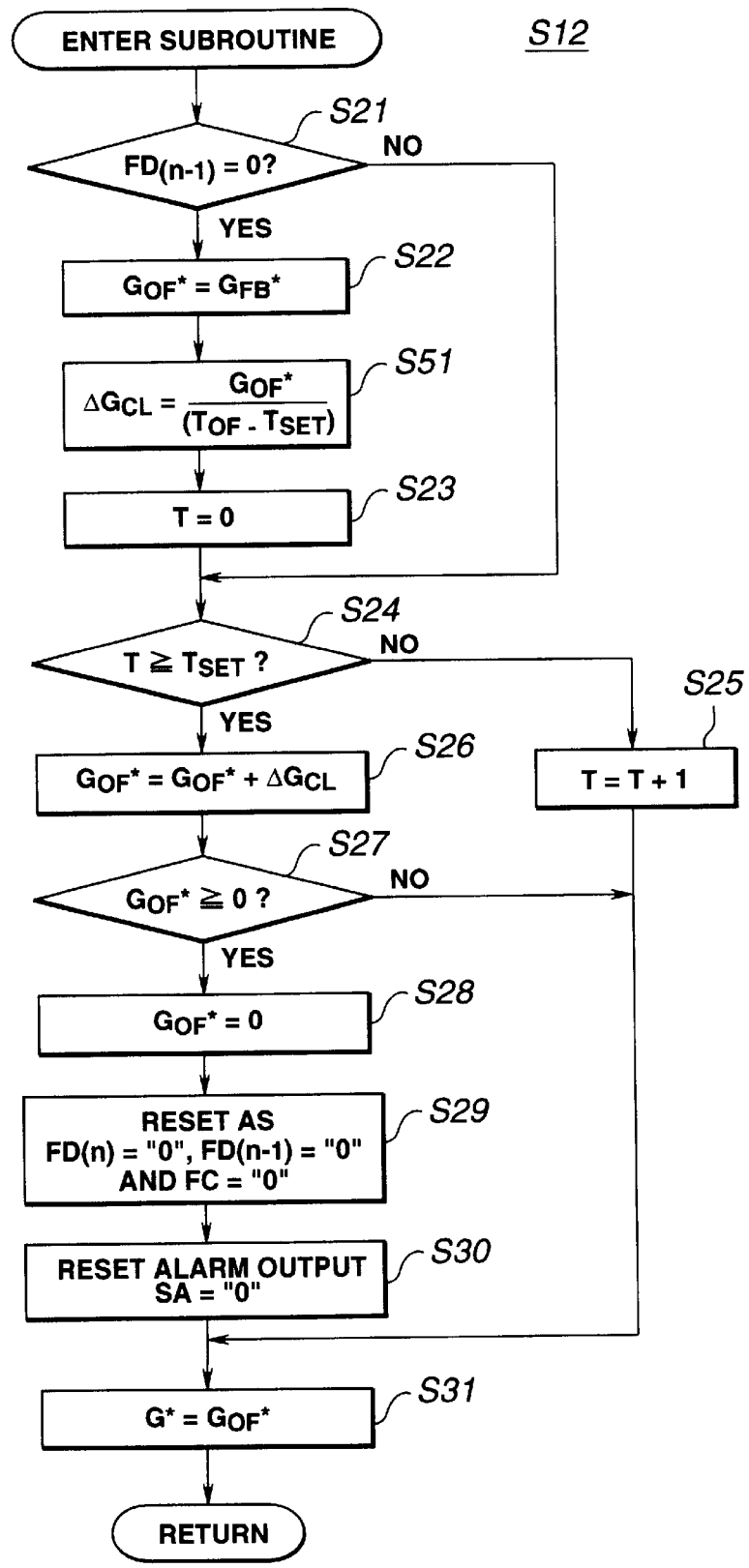

APPARATUS AND METHOD FOR PERFORMING AUTOMATIC CONTROL OVER VELOCITY OF AUTOMOTIVE VEHICLE

BACKGROUND OF THE INVENTION a) Field of the Invention

The present invention relates to apparatus and method for performing an automatic control over a velocity of an automotive vehicle in which the apparatus is mounted so as to maintain an inter-vehicle distance from the vehicle to another vehicle running ahead of the vehicle to follow up the other vehicle.

b) Description of the Related Art

A Japanese Patent Application First Publication (non-examined) No. Heisei 9-263160 published on Oct. 7, 1997 exemplifies a previously proposed automatic vehicular velocity control system.

In the previously proposed automatic vehicular velocity control system disclosed in the above-identified Japanese Patent Application First Publication, such a cruise control that the vehicular velocity is made coincident with a target vehicular velocity when an inter-vehicle distance from the vehicle equipped with the apparatus to another vehicle running ahead of the vehicle is equal to or above a constant value is carried out.

When the inter-vehicle distance is below the constant value, the previously proposed automatic vehicular velocity controlling apparatus carries out such a follow-up cruise control as to maintain the inter-vehicle distance to the other vehicle at a constant value. Furthermore, when a vehicular velocity control releasing condition is established such that during the above-described cruise control state, the vehicular velocity becomes below a controllable lowest velocity value due to a depression of a brake pedal of the vehicle, a release of a clutch pedal of the vehicle, or an operation of a release switch of the vehicle, the previously proposed automatic vehicular velocity controlling apparatus releases its preceding vehicle follow-up running cruise control function.

SUMMARY OF THE INVENTION

However, in the previously proposed automatic vehicular velocity controlling apparatus, when the vehicle cruises with the vehicular velocity exceeding the controllable lowest vehicular velocity (Vo) and approaches to the other vehicle running ahead of the vehicle and the inter-vehicle distance is equal to or below a target inter-vehicle distance, a vehicular brake system is operated so that the vehicle is decelerated.

The vehicular velocity is, then, decreased with a target vehicular acceleration/deceleration increased in a negative direction. When this state is continued and the vehicular velocity becomes equal to or below the controllable lowest vehicular velocity (Vo) the condition to release the velocity control is established so that the vehicular velocity control such as described in the BACKGROUND OF THE INVENTION is released. Hence, the target vehicular acceleration/deceleration is immediately recovered to zero so that an abrupt variation in the vehicular acceleration/deceleration occurs.

It is, therefore, an object of the present invention to provide apparatus and method for performing an automatic control over the vehicular velocity which can positively prevent the abrupt variation in the vehicular acceleration/deceleration when the vehicular velocity during the deceleration state becomes equal to or below the controllable lowest velocity value and the cruise control release condition is established and, preferably, can assure an information on the vehicular cruise control release to the vehicle driver.

The above-described object can be achieved by providing an apparatus for an automotive vehicle. The apparatus comprises: an inter-vehicle distance detector for detecting an inter-vehicle distance from the vehicle to another vehicle which is running at a detected inter-vehicle distance with respect to the vehicle; a vehicular velocity detector for detecting a vehicular velocity of the vehicle; a target vehicle velocity variation rate setter for setting a target vehicular velocity variation rate so that the detected inter-vehicle distance coincides with a target inter-vehicle distance; a vehicular running controller for effecting a vehicular velocity control such that the vehicle follows up the another vehicle maintaining the inter-vehicle distance to the another vehicle at the target inter-vehicle distance and that a vehicular velocity variation rate is maintained at the set target vehicular velocity variation rate; and a vehicular running control releaser for releasing the vehicular running control effected by the vehicular running controller and for moderating a rate of variation with time in the vehicular velocity variation rate set when releasing the vehicular velocity control, when the detected vehicular velocity becomes lower than a set vehicular velocity above which the vehicular velocity control by the vehicular running controller is effected.

The above-described object can also be achieved by providing a method applicable to an automotive vehicle. The method comprises detecting an inter-vehicle distance from the vehicle to another vehicle which is running at a detected inter-vehicle distance with respect to the vehicle; detecting a vehicular velocity of the vehicle; setting a target vehicular velocity variation rate so that the detected inter-vehicle distance coincides with a target inter-vehicle distance: effecting a vehicular velocity control such that the vehicle follows up the another vehicle maintaining the inter-vehicle distance to the another vehicle at the target inter-vehicle distance; effecting the vehicular velocity control such that a vehicular velocity variation rate is maintained at the set target vehicular velocity variation rate; releasing the vehicular running control effected by the vehicular running controller; and moderating a rate of variation with time in the vehicular velocity variation rate set when releasing the vehicular velocity control, when the detected vehicular velocity becomes lower than a set vehicular velocity above which the vehicular velocity control is effected.

BRIEF DESCRIPTION OF THE DRAWINGS

FIG. 8 is another flowchart for explaining the running control release procedure executed by the automatic running controller in a third preferred embodiment according to the present invention.

BEST MODE FOR CARRYING OUT THE INVENTION

Reference will hereinafter be wade to the drawings in order to facilitate a better understanding of the present invention.

Figure 1A:
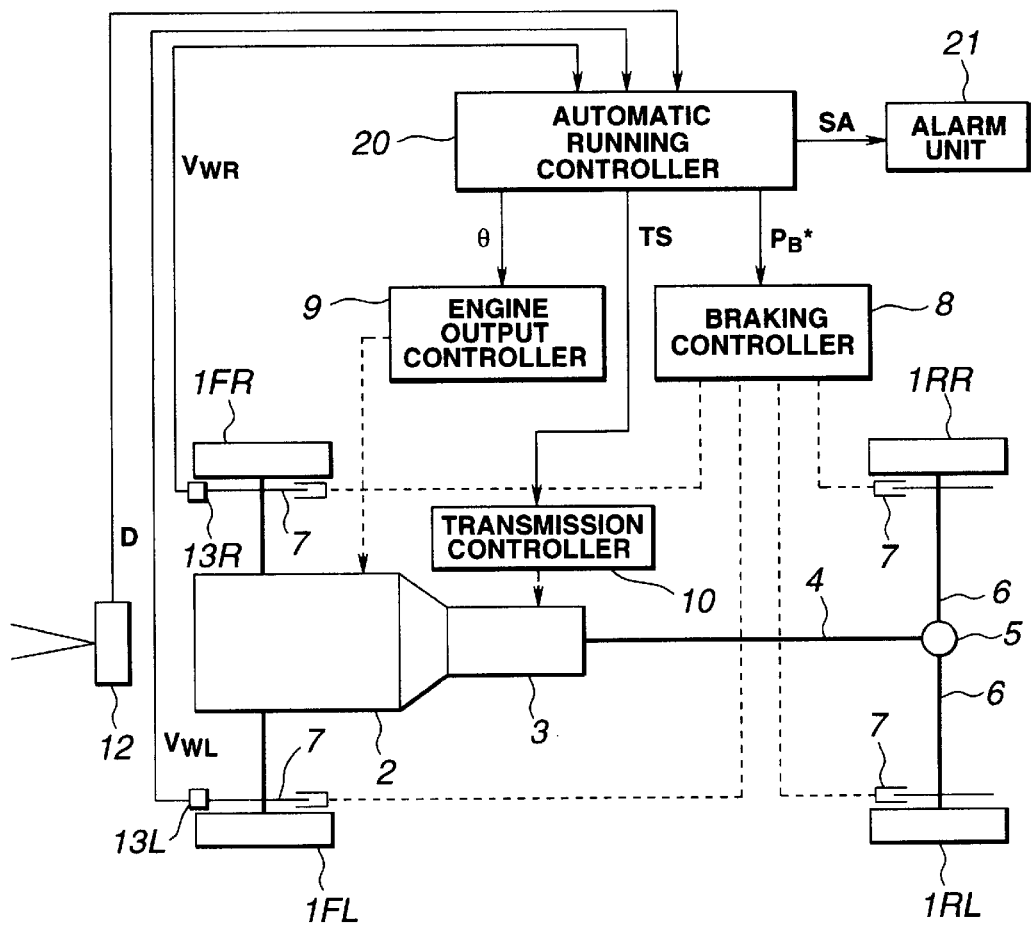
FIG. 1A is a schematic system configuration of an apparatus for performing an automatic control over a vehicular velocity of an automotive vehicle in a first preferred embodiment according to the present invention.

FIG. 1A shows a schematic configuration of an automatic vehicular velocity controlling apparatus in a first preferred embodiment according to the present invention applicable to a rear-wheel drive vehicle.

Figure 1B:
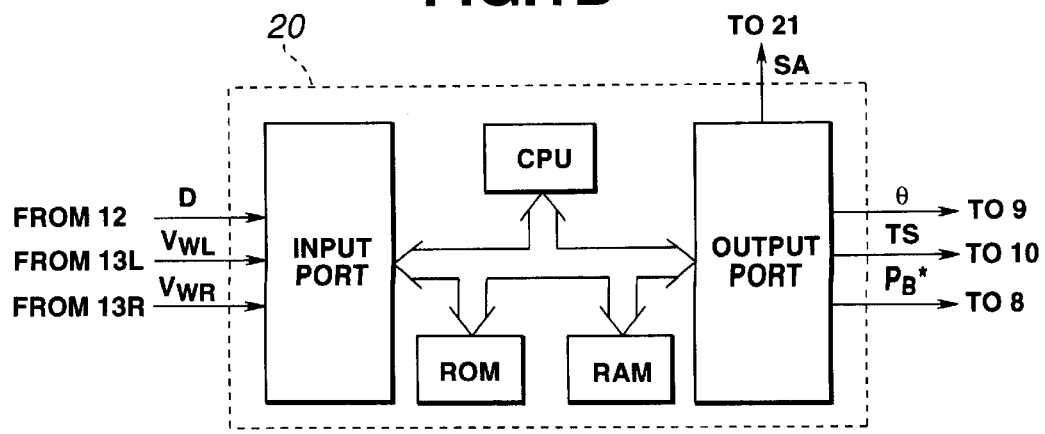
FIG. 1B is a schematic block diagram of an automatic running controller shown in FIG. 1A.

FIG. 1B shows an internal configuration of a vehicular running controller shown in FIG. 1A.

In FIG. 1A, 1FL and 1FR denote front left and right road wheels as steered wheels and 1RL and 1RR denote rear left and right road wheels as driven wheels.

A driving force of the engine 2 is transmitted to the rear left and right road wheels 1RL and 1RR to be drivingly rotated via an automatic transmission 3, a propeller shaft 4, a final differential (speed reduction) gear 5, and an axle 6.

A disc brake 7 is disposed on the front left and right road wheels 1FL and 1RR for generating a braking force to be applied to each corresponding road wheel and a braking hydraulic of the disc brake and a braking hydraulic of the disc brake 7 is controlled by means of a braking controller 9.

The braking controller 8 generates a braking hydraulic according to a depression depth of a brake pedal of the vehicle (not shown) (operating variable of the brake pedal).

In addition, the braking controller 8 generates the braking hydraulic In response to a braking pressure command value from the vehicular running controller 20.

In addition, an engine output controller 9 to perform a control over an output of an engine 2 is disposed on the engine 2. A method of controlling the engine output includes a method of controlling an engine speed by adjusting an opening angle of an engine throttle valve or includes a method of controlling an idling control valve. In the first embodiment, the former method of controlling the engine speed has been adopted.

Furthermore, a transmission controller 10 is disposed for controlling a gear shift position of an automatic transmission 3. The transmission controller 10 performs an up-shift or down-shift operation on the gear shift position of the automatic transmission 3 when an up or down shift command value TS from a vehicular running controller 20 as will be described later is inputted.

On the other hand, an inter-vehicle distance sensor 12 is disposed on a lower part of a vehicle body located on a forward position of the vehicle which is constituted by a radar unit.

The inter-vehicle distance sensor 12 constituted by the radar unit is exemplified by a U.S. Pat. No. 5,710,565, (the disclosure of which is herein incorporated by reference).

In addition, road wheel velocity sensors 13L and 13R are interposed between the vehicle body, the front left road wheel 1FL, and the front right road wheel 1FR for detecting a road wheel velocity of each corresponding road wheel.

Each output signal of the inter-vehicle distance sensor 12 and road wheel velocity sensors 13L and 13R is inputted into the vehicular running controller 20.

Operations of the braking controller 8, the engine output controller 9, the transmission controller 10, and an alarm unit 21 constituted by, for example, a buzzer are controlled on the basis of the inter-vehicle distance L denoted by the inter-vehicle distance sensor 12 and the road wheel velocities VWL and VWR detected by the road wheel velocity sensors 13L and 13R so that a preceding vehicle follow-up control such that the vehicle runs after another vehicle running ahead of the vehicle maintaining an appropriate inter-vehicle distance with respect to the other vehicle is carried out.

When, during the follow-up running control, the vehicular velocity becomes lowered and equal to or below a set vehicular velocity (so-called, a controllable lowest vehicular velocity) due to an interruption of another vehicle before the vehicle on the same traffic lane as the vehicle or due to a transition of tho other vehicle running ahead of the vehicle into its deceleration state, the vehicular running controller 20 produces an alarm signal to the alarm unit 21 to drive the alarm unit 21 and, simultaneously, carries out a control release processing such that after the target acceleration/deceleration is held for a set hold time duration, the acceleration/deceleration of the vehicle is recovered to zero at a moderate variation rate.

Next, an operation of the first embodiment of the automatic vehicular velocity controller 20 will be described with reference to an operational flowchart executed by the vehicular running controller 20.

Figure 2:
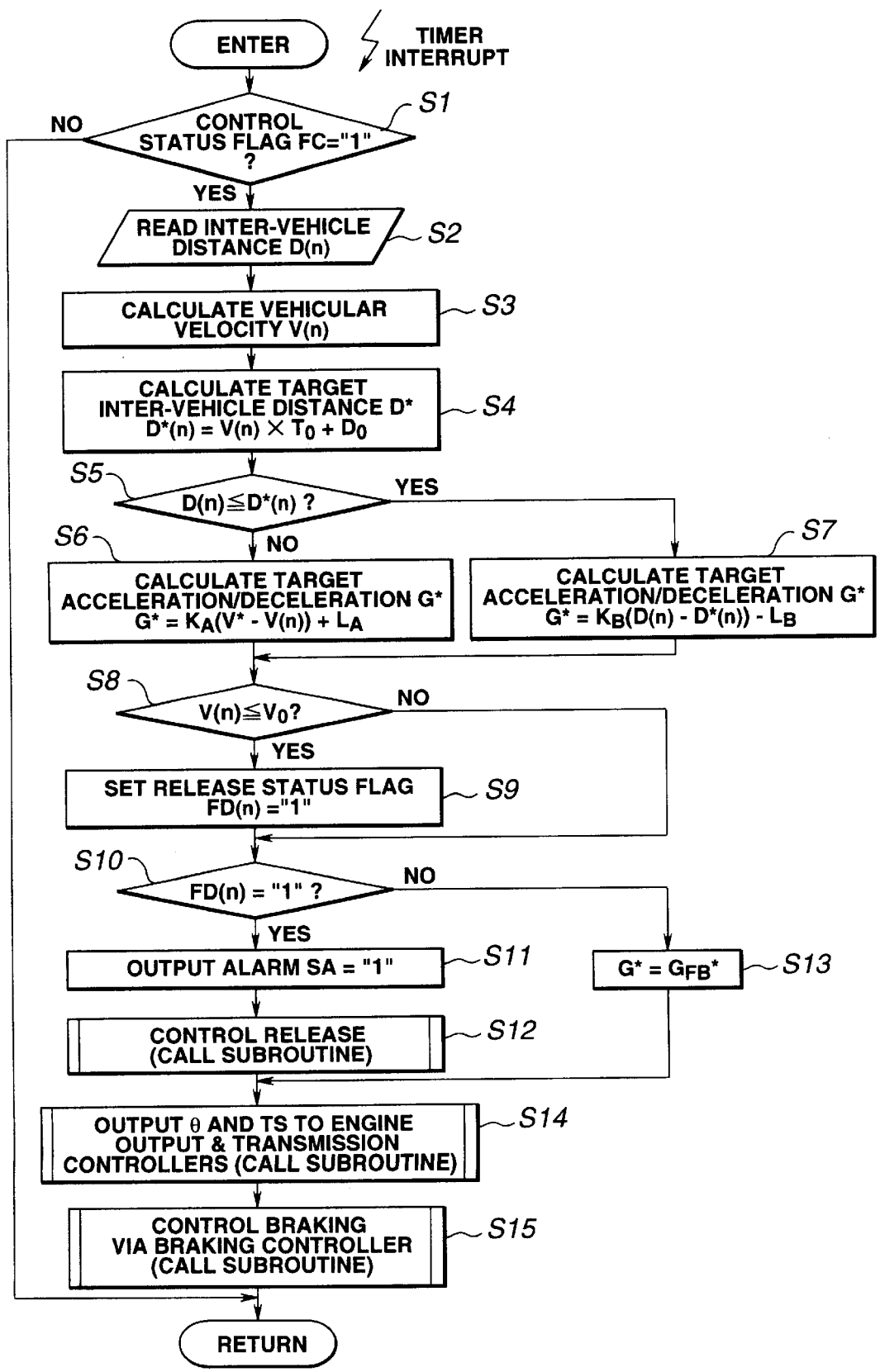
FIG. 2 is an operational flowchart for explaining a running control procedure executed by the automatic running controller shown in FIG. 1A.

The running control processing shown In FIG. 2 is executed as a timer interrupt processing for each predetermined time (for example, 10 milliseconds) to a predetermined main routine.

That is to say, at a step S1, the CPU of the vehicular running controller 20 determines whether the vehicle falls in the follow-up running control state from a bit state of a control status flag FC.

If the control status flag FC is reset to "0" at the step S1, the vehicular running controller 20 does not determine that the follow-up running control is executed and the present timer interrupt processing is ended to return to the predetermined main routine.

If the control statue flag FC is set to "1" at the step S1 (yes), the CPU of the controller 20 determines that the follow-up running control is being executed and the routine goes to a step S2.

At the step S2, the CPU of the controller 20 reads the inter-vehicle distance D between the actual preceding vehicle and the vehicle detected by means of the inter-vehicle distance sensor 12. At the next step S3, the CPU of the controller 20 reads the road wheel velocities VWL and VWR detected by means of the road wheel velocity sensors 13L and 13R.

By deriving an average value of the road wheel velocities VWL and VWR, the CPU of the controller 20 calculates a vehicular velocity V(n). It is noted that n denotes an arbitrary number and a present value derived at the present routine shown in FIG. 2.

Next, the routine goes to a step S4. At the step S4, the CPU of the vehicular running controller 20 calculates a target inter-vehicle distance D* between the preceding vehicle and the vehicle in accordance with the following equation (1) according to the vehicular velocity V(n) and a time duration To (inter-vehicle time duration) for which the vehicle has reached to a position Lo [m] behind of the present preceding vehicle.

$$D^*(n) = V(n) \times To = Do \qquad (1).$$

By adopting a concept of the inter-vehicle time duration, the target inter-vehicle distance D* is set such that as the vehicular velocity becomes increased, the inter-vehicle distance becomes long. It is noted that in the equation (1), Do denotes an inter-vehicle distance if the vehicle has stopped.

At the next step S5, the CPU of the vehicular running controller 20 determines whether the presently detected inter-vehicle distance D(n) is equal to or below the calculated target inter-vehicle distance D*(n).

If No at the step S5 (D(n)>D*(n)). the routine goes to a step S6 in which the CPU of the vehicular running controller 20 determines that the inter-vehicle distance D(n) is in excess of the target inter-vehicle distance D*(n) and it is possible for the vehicle to be accelerated and approached to the preceding vehicle thus the inter-vehicle distance becoming shorter, calculates a target acceleration/deceleration $G_{FB}^*$ in accordance with the following equation (2) on the basis of a previously set target vehicular velocity V*, and assigns the calculated target acceleration/deceleration $G_{FB}^*$ into a memory location in which the target acceleration/deceleration is stored so as to update $G_{Fb}^*$.

$$G_{FB}^* = K_A \times (V^* - V(n)) + L_A \qquad (2).$$

In the equation (2), $K_A$ and $L_A$ denote constants
Then, the routine goes to a step S8.
On the other hand, if Yes at the step S5 (D(n)≦D*(n)), the CPU of the controller 20 determines that the presently detected inter-vehicle distance D(n) is equal to or shorter than the target inter-vehicle distance D*(n) and determines that it is necessary to widen the inter-vehicle distance to decelerate the vehicle. Then, the routine goes to a step S7.

At the step S7, the CPU of the vehicular running controller 20 calculates the target acceleration/deceleration $G_{FB}^*$ into the memory location in which $G_{FB}^*$ is stored so as to update $G_{FB}^*$.

Then, the routine goes to the step S8.

$$G_{FB}^* = K_B \times (D(n) - D^*(n)) - L_B \qquad (3).$$

In the equation (3), $K_B$ and $L_B$ denote constants.
At the step S8, the CPU of the controller 20 determines whether the vehicular velocity V(n) is equal to or below the set vehicular velocity Vo (for example, approximately 30 Km/h) which indicates a lowest limit vehicular velocity above which the present vehicular running control can be maintained.

If V(n)≦Vo (yes) at the step S8, the routine goes to a step S9 in which a control release status flag FD(n) is set to "1" representing whether a control release processing states is on or off. Then, the routine goes to a step S10. If V(n)>Vo (No) at the step S8, the routine jumps to the step S10.

At the step S10, the CPU of the vehicular running controller 20 determines whether the control release status flag FD(n) is set to "1". If the control release flag FD(n) is set to "1" at the step S10, the routine goes to a step S11 in which an alarm output SA having a logical value of "1" is supplied to the alarm unit 21.

At the next step S12, the CPU of the vehicular running controller 20 executes a control release process which will be described later.

Then, the routine goes to a step S14.
On the other hand if the control release status flag FD(n)="0" at the step S11, the routine goes to a step S13 in which the target acceleration/deceleration $G_{FB}^*$ is set as the target acceleration/deceleration G* and the routine goes to a step S13 Without the control release process at the step S12.

At the step S13, the CPU of the controller 20 sets the target acceleration/deceleration $G_{FB}^*$ calculated at the step S7 as a target acceleration/deceleration G* and the routine goes to a step S14.

At the step S14, the CPU of the vehicular automatic running controller 20 calculates an instruction value θ of an engine throttle valve opening angle for the engine output controller 9 and an instruction value TS to up-shift and down-shift for the transmission controller 10 and executes these values to be outputted to tho respective controllers 9 and 10.

Then, the routine goes to a step S15.
The instruction value θ of the engine throttle opening angle will be described below.

If the target acceleration/deceleration G* is a positive value i.e., indicates the acceleration state, the CPU of the vehicular running controller 20 calculates a variation rate Δ θ of the engine throttle valve opening angle which is Increased in a positive direction in accordance with km increase in the target acceleration/deceleration G*. If the target acceleration/deceleration G* is a negative value, i.e., indicates the deceleration state, the CPU of the controller 20 calculates the variation rate Δ θ of the engine throttle valve opening angle which is increased in a negative direction in accordance with an increase in the negative direction of the target acceleration/deceleration G* until the target acceleration/deceleration G* has reached from zero to a predetermined value −Gs.

Then, the CPU of the controller 20 adds the calculated variation rate Δ θ of the calculated throttle valve opening angle to the present instruction value θ so as to derive a new instruction value θ of the engine throttle valve opening angle (θ=θ+Δθ).

If the target acceleration/deceleration G* is in excess of a predetermined value −Gs, the CPU of the controller 20 sets the instruction value θ of the throttle valve opening angle to zero or a value in the vicinity to zero.

In addition, the instruction value TS of the up-shift or down-shift of the gear shift in the automatic transmission 3 is calculated by referring to a map of a gear shift control in the same manner as a normal automatic transmission on the basis of the calculated instruction value θ of the engine throttle valve opening angle and the present vehicular Velocity V(n).

At the next step S15, the CPU of the vehicular running controller 20 calculates a target braking pressure $P_B^*$ on the basis of the target acceleration/deceleration G* stored in the acceleration/deceleration memory location.

After a braking pressure control processing is carried out to output the target braking pressure $P_B^*$ as the braking pressure instruction value to the braking controller 8, the present time interrupt routine is ended and is returned to the predetermined main program routine.

Figure 4:
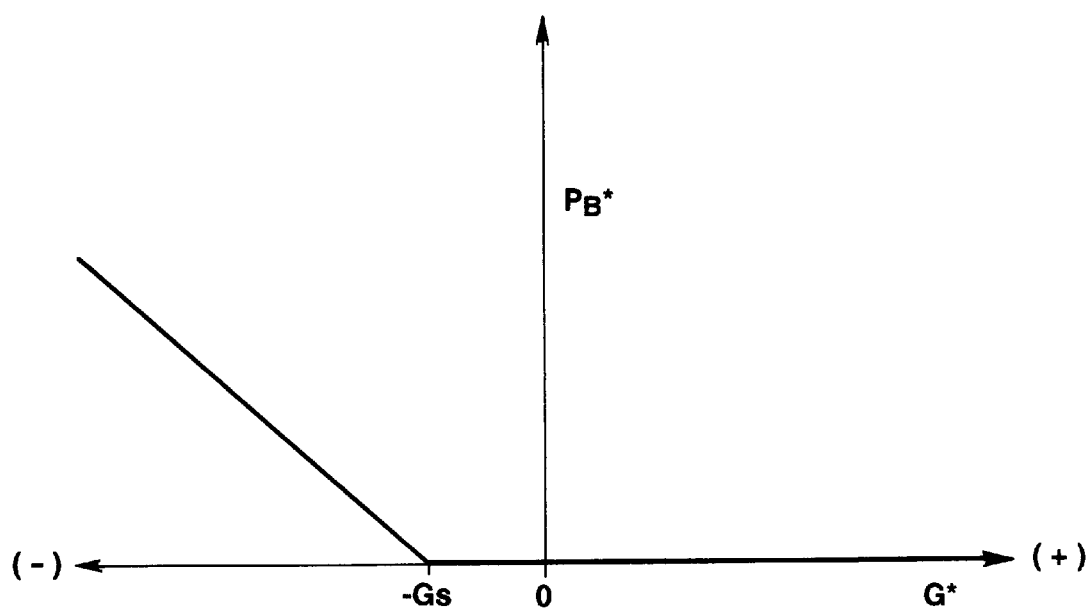
FIG. 4 is a characteristic graph representing an example of a map deriving a target braking pressure representing a relationship between a target acceleration/deceleration and the target braking pressure.

The CPU of the vehicular running controller 20 calculates the target braking pressure $P_B^*$ on the basis of the target acceleration/deceleration G* by referring to a braking pressure map shown in FIG. 4.

As shown in FIG. 4, the braking pressure map is set such that a lateral axis indicates the target acceleration/deceleration G* and a longitudinal axis indicates the target braking pressure $P_B^*$.

When the target acceleration/deceleration G* indicates positive and indicates negative until it is equal to or in excess of the predetermined value −Gs, the CPU of the controller 20 is set such that the target braking pressure $P_B^*$ is linearly increased in proportion to the increase in the negative direction of the target acceleration/deceleration G*.

Figure 3:
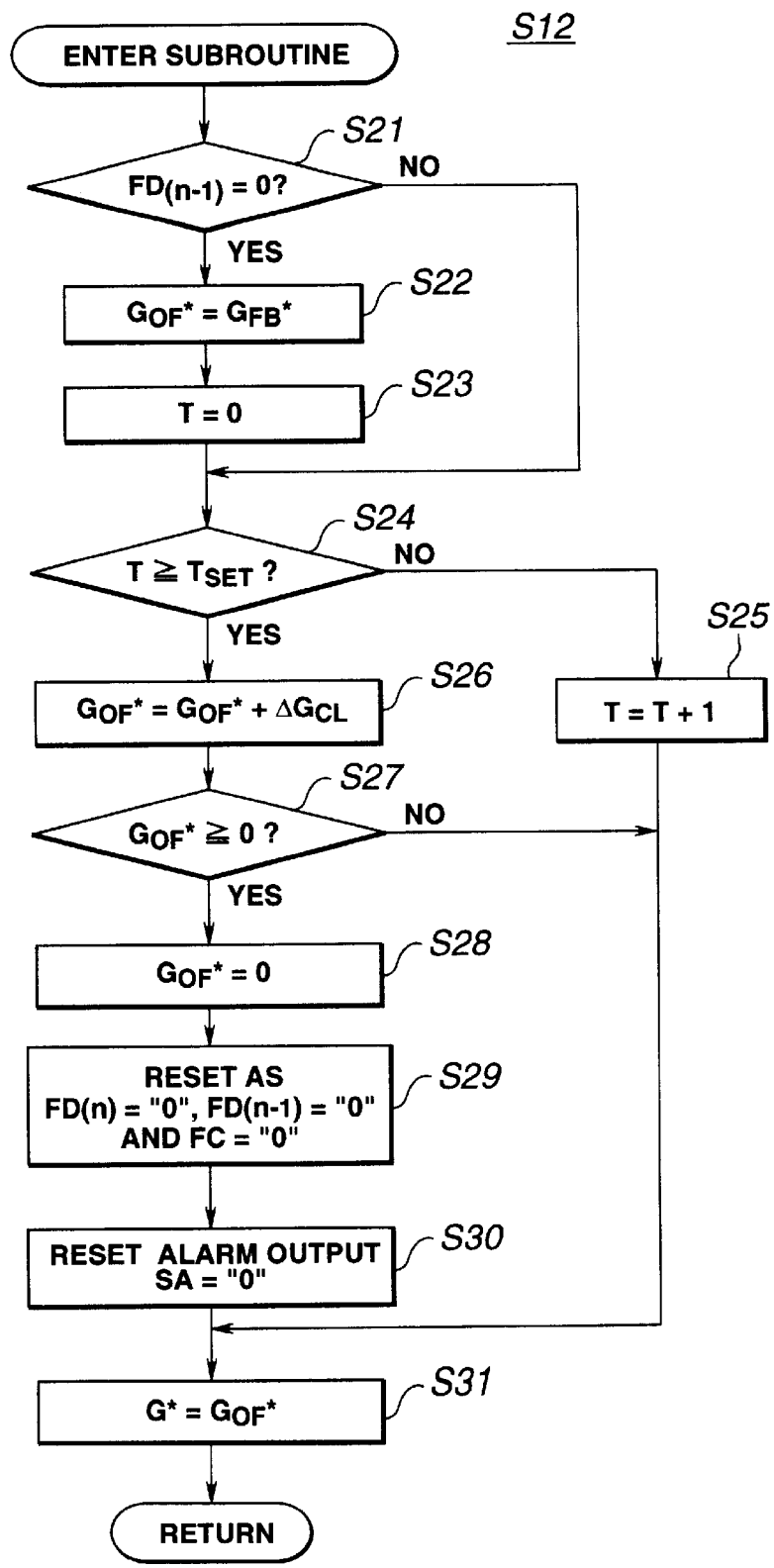
FIG. 3 is an operational flowchart for explaining the contents of a step S15 shown in FIG. 2.

FIG. 3 shows a specific example of the control release process of the step S12 described above.

In FIG. 3 at a step S21, the CPU of the vehicular running controller 20 reads the previous value FD(n−1) of the control release status flag and determines whether FD(n−1) has been reset to "0".

If FD(n−1)="0" at the step S10 (Yes), the CPU of the controller 20 determines that it is the first time for the vehicular running controller 20 to be in the control release state and the routine goes to a step S22.

At the step S22, the CPU of the vehicular running controller 20 sets the target acceleration/deceleration $G_{FB}^*$ calculated at the step S7 as a control release purpose target acceleration/deceleration $G_{OF}^*$, the control release purpose target acceleration/deceleration $G_{FB}^*$ being stored into the control release purpose target acceleration/deceleration memory location $G_{OF}^*$ so as to update $G_{OF}^*$.

At the next step S23, the CPU of the controller 20 clears a count value T of a hold time duration timer for monitoring a hold time duration of the target acceleration/deceleration to "0" and the routine goes to a step S24.

If the previous value FD(n−1) is set to "1" at the step S24, the CPU of the controller 20 determines that the control release status is continued and the routine directly goes to the step S24.

At the step S24, the CPU of the vehicular running controller 20 determines whether the count value T of the hold time duration timer is equal to or above a set value Tset which is set to a time duration sufficient for the alarm issued from the alarm unit 21 to be positively recognized by the driver. If $T<T_{SET}$ at the step S24 (No), the CPU of the controller 20 determines that the hold state is continued and the routine goes to a step S25.

At the step S25, the CPU of the vehicular running controller 20 increments the count value T of the hold time duration timer by one and the routine jumps to a step S31.

If $T \geq T_{SET}$ at the step S24, the CPU of the controller 20 determines that the hold time duration has passed and the routine goes to a step S26.

At the step S26, the CPU of the controller 20 adds a predetermined value $\Delta G_{CL}$ to the present target acceleration/deceleration $G_{OF}^*$ stored in the memory location in which the control release purpose target acceleration/deceleration is stored to provide a new target acceleration/deceleration $G_{Of}^*$ in accordance with the following equation (4), the new target acceleration/deceleration memory location so as to update $G_{OP}^*$.

Then, the routine goes to a step 927.

$$G_{OF}^* = G_{OF}^* + \Delta G_{CL} \quad (4).$$

At the step 627, the CPU of the vehicular running controller 20 determines if the target acceleration/deceleration $G_{OF}^*$ is equal to or above zero ($G_{OF}^* \geq 0$) representing the end of the control release process.

If $G_{OF}^* \geq 0$ at the step S27 (Yes), the CPU of the vehicular running controller 20 determines the end of the control release and the routine goes to a step S28.

At the step S28, the control release purpose target acceleration/deceleration $G_{OF}^*$ is set to "0" ($GO_{OF}^*=0$) and stored into the control release purpose target acceleration/deceleration memory location.

At the subsequent step S29, the control release status flags FD(n) and FD(n−1) and the control status flag FC are reset to "0".

At the subsequent step S30, the alarm unit SA having the logical value of "0" is outputted.

At the subsequent step S31, the CPU of the controller 20 determines whether $G^*=G_{OF}^*$.

If $G_{OF}^*<0$ (No) at the step S27, the CPU of the controller 20 determines that the present state is in a midway through the control release state and goes directly to the step S31.

At the step S31, the CPU of the controller 20 sets the target acceleration/deceleration $G_{OF}^*$ stored and updated In the control release purpose target acceleration/deceleration memory location as the target acceleration/deceleration G*.

Upon the and of the control release processing of FIG. 3, the present routine is transferred to the processing at the step S14 in FIG. 2.

Figure 5:
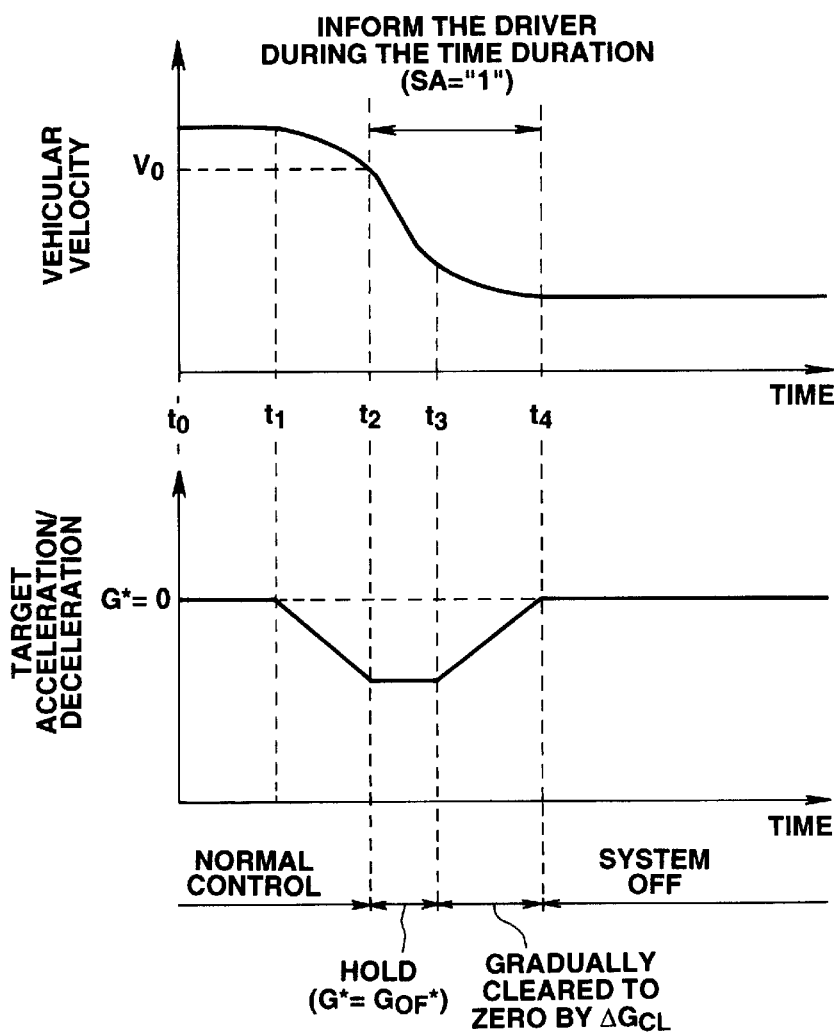
FIGS. 5A and 5B are timing charts when a preceding vehicle used for explaining an operation of the first preferred embodiment shown in FIG. 1A is transferred from an acceleration state to a deceleration state.

Hence, suppose that, as shown in FIGS. 5A and 5B, the control status flag FC is set to "1" at a time point to and the vehicular velocity V(n) is equal to or above the set vehicular velocity Vo under the preceding vehicle follow-up running control state, and the vehicle cruises (runs automatically at a constant velocity) with the inter-vehicle distance D between the vehicle and the preceding vehicle coincident with the target inter-vehicle distance D*.

If the inter-vehicle distance D becomes lower (shorter) than the target inter-vehicle distance D* due to an interruption of the vehicle from another traffic lane into the same traffic lane or due to the deceleration state of the preceding vehicle at a time t1 from the above-described cruise run condition, the target acceleration/deceleration $G_{FB}^*$ representing a minus deceleration as shown in FIG. 5B is calculated at a step S7. Since the vehicular velocity V(n) is in excess of the set vehicular velocity Vo, the routine is transferred from the step S8 to the step S10.

Since the control release status flag FD(n) is left to be reset to "0", the target acceleration/deceleration $G_{FB}^*$ calculated at the step S7 is set as the target acceleration/deceleration G*.

Accordingly, the CPU of the controller 20 calculates the target braking pressure $P_B^*$ in accordance with the target acceleration/deceleration $G_{PB}^*$ at the step S15.

The target braking pressure $P_B^*$ is supplied to the braking controller 8 shown In FIG. 1A so that a braking pressure on a disc brake 7 of each road wheel is controlled so as to be made coincident with the target braking pressure $P_B^*$.

Thus, the vehicle is in the braking condition. Accordingly, the vehicular velocity V(n) is decelerated as shown in FIG. 5A.

Thereafter, the target acceleration/deceleration $G_{Fb}^*$ is increased further in the negative direction. Consequently, when the vehicular velocity V(n) is equal to or below the set vehicular velocity Vo at a time point $t_2$, the routine goes from the step S8 to the step S9 at the process of FIG. 2.

When the control release status flag FD(n) is set to "1" at the step S9, the routine goes from the step S10 to the step S11 in which the routine goes from the step S10 to the step S11.

The alarm output SA of the logical value of "1" is outputted to the alarm unit 21.

The alarm circuit 21 is used to issue the alarm so that the vehicular driver is informed that the follow-up running control is released.

At the step S12, the control release processing of FIG. 3 is executed.

At this time, since the previous value FD(n−1) of the control release status flag is reset to "0", the routine is transferred from the step S21 to the step S22 in which the target acceleration/deceleration $G_{FB}*$ calculated at the step S7 is set as the control release purpose target acceleration/deceleration memory location $G_{OF}*$.

Accordingly, the braking pressure control is continued according to the target acceleration/deceleration G* at the step S15.

Thereafter, when the process of FIG. 3 is executed upon the passage of the predetermined timer interrupt period, the previous value FD(n−1) of the control release status flag at the step S21 is set to "1".

Hence, the CPU of the controller 20 has directly transferred to the step S24 without transfer or the routine to the step S22.

Since the hold time duration is not passed, the routine transfers to the step S25 to increment the count value T of the hold time duration timer by "1" and transfers to the step S31.

Hence, since the previous target braking pressure $P_B*$ is maintained at the braking control procedure at the step S15 of FIG. 2, in the CPU of the vehicular running controller 20, the routine goes from the step S24 to the step S26 in FIG. 3 and the braking condition is maintained and the vehicular velocity V(n) is continued to be decreased as shown in FIG. 5A.

If the count value of the hold time duration timer is equal to or above a set value $T_{SET}$ at a time point $t_3$ from the hold state of the target acceleration/deceleration G*, the routine transfers from the step 524 to the step S26 at the step of FIG. 3.

When the control release purpose target acceleration $G_{OF}*$ is increased by the set value $\Delta G_{CL}$, the minus deceleration is decreased as shown in FIG. 5B.

Accordingly, since the target braking pressure $P_B*$ calculated at the step S15 of FIG. 2 becomes accordingly reduced, the vehicular velocity V(n) becomes moderately reduced.

Thereafter, whenever the processing routine in FIG. 3 is repeated, the control release purpose target acceleration/deceleration $G_{OF}*$ is gradually increased by $\Delta G_\alpha$.

When the control release purpose target acceleration/deceleration $G_{OF}*$ is in excess of zero at a time point of t4, the routine transfers from the step S27 to the step S28 in FIG. 3 so as to set the control release purpose target acceleration/deceleration to zero ("0"), the zeroed control release purpose target acceleration/deceleration memory location.

Next, the routine goes to the step S29 to reset the control status flag FC to zero so as to release the preceding vehicle follow-up running control. At this time, the release status flag FD(n) and FD(n−1) are reset to zero.

Next, the routine goes to a step S30 in which the alarm output SA having the logical value of a "0" is outputted to the alarm circuit 21. Hence, the alarm issued by the alarm circuit 21 is stopped.

Therefore, the routine goes to the step S31 to set the target acceleration/deceleration to zero.

At the step S15 of FIG. 2, the target acceleration/deceleration G* is set to zero ("0"). Hence, the CPU of the controller 20 returns the target braking pressure $P_B*$ to zero with the target acceleration/deceleration G* zeroed at the step S15 of FIG. 2. Consequently, the braking pressure of each road wheel's disc brake 7 is set to zero so that the braking state is released. As shown in FIG. 5A, the vehicle is transferred moderately to run at the constant velocity.

In this way, in the first embodiment, during the preceding vehicle follow-up control state, the inter-vehicle distance D to the preceding vehicle becomes shorter than the target inter-vehicle distance D* so that by the calculation of the negative target acceleration/deceleration $G_{PB}$, the vehicle is decelerated.

If the vehicular velocity V(n) is made equal to or below the set vehicular velocity Vo, the alarm unit 21 issues the alarm informing that the preceding vehicle follow-up running control is released. At the same time, the target acceleration/deceleration G* is held. After a predetermined hold time duration is passed, the target acceleration/deceleration G* is directed toward zero.

When the target acceleration/deceleration G* indicates zero, the preceding vehicle follow-up running control is released.

Hence, in the first preferred embodiment, no abrupt change in the target acceleration/deceleration occurs and can be assured and the alarm can be issued to the driver without failure.

Next, a second preferred embodiment according to the present invention will be described with reference to FIGS. 6 and 7.

Although, In the first embodiment, a time duration for which the alarm is issued by the alarm unit 21 is dependent upon a magnitude of the target acceleration/deceleration $G_{FB}*$ when the vehicular velocity V(n) is equal to or below the set vehicular velocity Vo, in the second embodiment, the time duration for which the alarm is issued by the alarm unit 21 is set to be constant irrespective of the magnitude of the target acceleration/deceleration.

Figure 6:
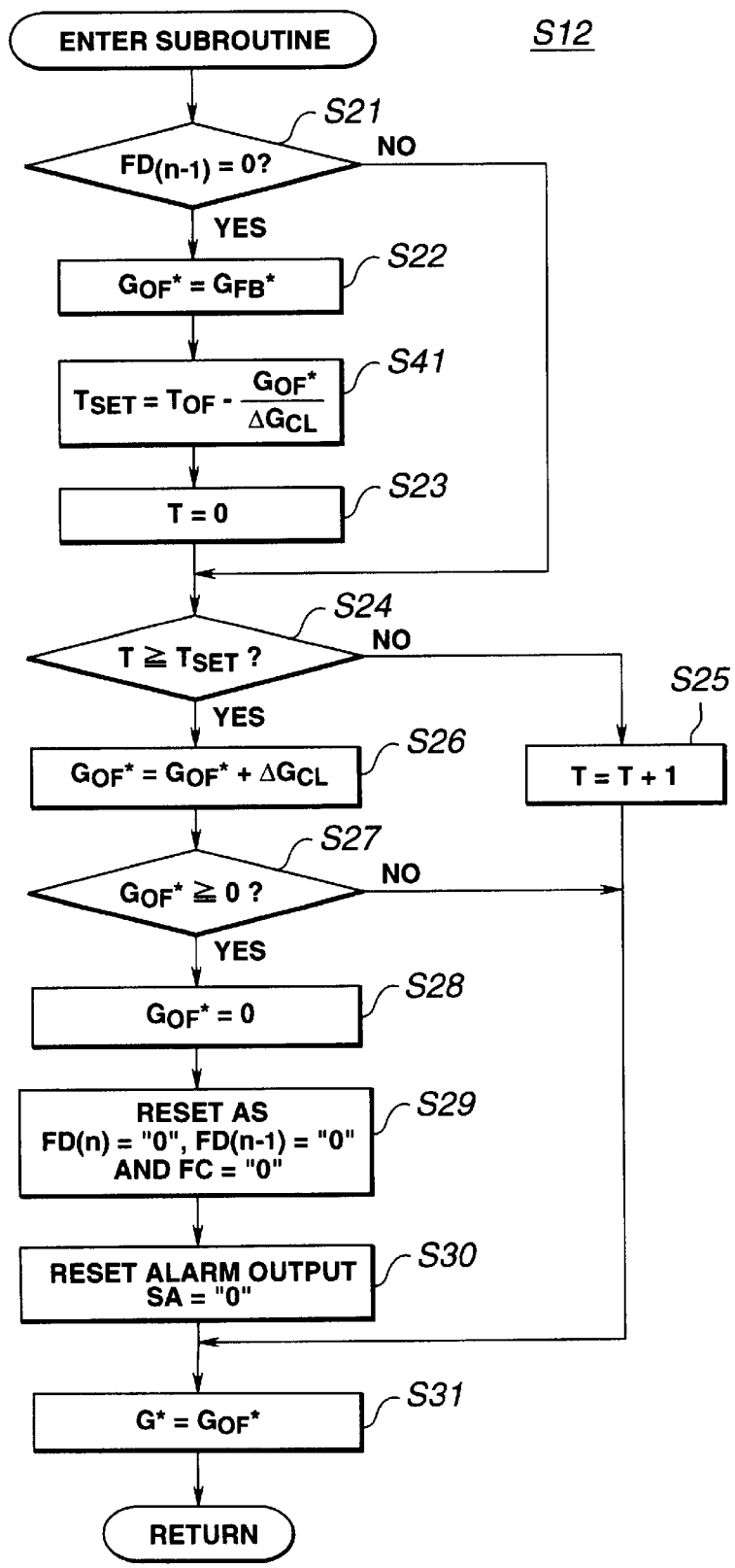
FIG. 6 is another flowchart for explaining a running control release procedure executed by the automatic running controller in a second preferred embodiment according to the present invention.

As shown in FIG. 6, the control release processing is generally the same as that shown in FIG. 3 except a step S41 is additionally interposed between the steps S22 and S23 for calculating the hold time duration. Hence, the same series of the steps as shown in FIG. 3 are designated by the same step numbers as shown in FIG. 6 and the detailed explanations of these steps are omitted herein.

At the step S41 of FIG. 6, the CPU of the controller 21 calculates the hold time duration $T_{SET}$ in accordance with the following equation (5) on the basis of the three factors, namely, the control release purpose target acceleration/deceleration $G_{OF}*$, the alarm time duration $T_{OF}$ required to inform the driver of the alarm when the control release is carried out, and an increment $\Delta G_{CL}$ of the target acceleration/deceleration $G_{OF}*$.

$$T_{SET}=T_{OF}-G_{OF}*/\Delta G_{CL} \qquad (5).$$

In the second embodiment, when the vehicle is decelerated under the preceding vehicle follow-up control state and the vehicular velocity V(n) is equal to or below a set vehicular velocity Vo, the routine transfers from the step S21 in FIG. 6 to the step S22.

The target acceleration/deceleration $G_{FB}*$ calculated at the step S7 is set as the control release purpose target acceleration/deceleration $G_{FB}*$ which is stored in the control release purpose target acceleration/deceleration memory location so as to update $G_{FB}*$. Then, the routine of FIG. 6 goes to the step S41 in which the hold time duration $T_{SET}$ is calculated in accordance with the equation (5).

Hence, since the hold time duration $T_{SET}$ is calculated by subtracting the division of the increment $\Delta G_{CL}$ by the control release purpose target acceleration/deceleration $G_{OF}*$ representing a time duration for which the control release purpose target acceleration/deceleration $G_{OF}*$ gives zero, the value of addition of the hold time duration $T_{SET}$ to the time duration for which the control release purpose target acceleration/deceleration $G_{OF}{}^*$ gives zero always indicates the alarm time duration $T_{OF}$.

Figure 7:
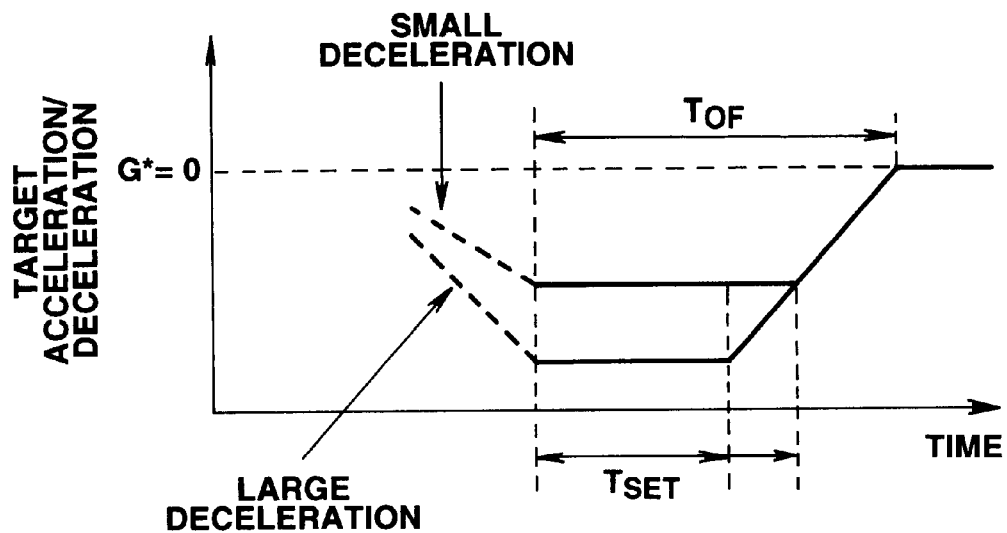
FIG. 7 is a timing chart for explaining an operation of the second preferred embodiment shown in FIG. 6.

As shown in FIG. 7, the alarm can be issued for the constant alarm time irrespective of the value of the control release purpose target acceleration/deceleration $G_{OF}{}^*$ when the vehicular velocity V(n) is below the set vehicular velocity Vo.

Figure 9:
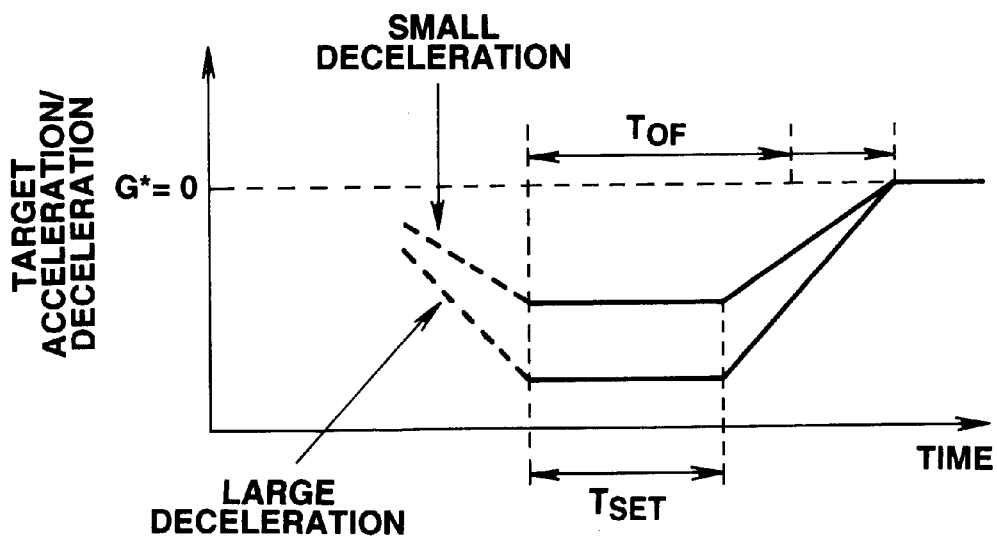
FIG. 9 is a timing chart for explaining an operation of the third preferred embodiment shown in FIG. 8.

FIGS. 8 and 9 show a third preferred embodiment of the apparatus for performing the automatic control over the vehicular velocity.

It is noted that, in the third embodiment, the alarm is informed of for the constant period of time to the driver in the same way as the second embodiment.

In the third embodiment, the control release processing is the same as that shown in FIG. 6 except that the step S41 in FIG. 6 of the second embodiment is replaced by a step S51 in which the increment rate (increment variable) $\Delta G_{CL}$ for the control release purpose target acceleration/deceleration $G_{OF}{}^*$ is modified with the hold time duration $T_{SET}$ held constant.

In the same step numbers of FIG. 8 as those in FIG. 6, the same contents are processed. Hence, the detailed explanations of these steps are omitted herein.

That is to say, the CPU of the controller 20 calculates the increment variable $\Delta G_{OL}$ on the basis of the control release purpose target acceleration/deceleration $G_{OF}{}^*$, the alarm time $T_{OF}$, and the hold time duration $T_{SET}$ set shorter than the hold time duration $T_{SET}$ described in the first embodiment in accordance with the following equation (6).

$$\Delta GC_{CL} - G_{OF}{}^*/(T_{OF} - T_{SET}). \qquad (6).$$

In the third embodiment, when the vehicle is decelerated under the preceding vehicle running control state and the vehicular velocity V(n) is equal to or below a set vehicular velocity Vo, the routine goes from the step S21 of FIG. 8 to the step S22 in which the target acceleration/deceleration $G_{FB}{}^*$ calculated at the step S7 as the control release purpose target acceleration/deceleration $G_{OF}{}^*$. Then, the target acceleration/deceleration $G_{OF}{}^*$ is stored in the memory location for the control release purpose target acceleration/deceleration. Then, the routine goes from the step S22 to the step S51 in which the increment variable $\Delta G_{CL}$ is calculated in accordance with the equation (6).

Therefore, the increment variable $\Delta G_{CL}$ calculated is a division of the control release purpose target acceleration/deceleration $G_{OF}{}^*$ by the remainder time subtracting the hold time duration $T_{SET}$ from the alarm time duration $T_{OF}$. Hence, if the remainder time becomes long, the increment variable $\Delta G_{CL}$ becomes short. On the contrary, if the remainder time is short, the increment variable $\Delta G_{CL}$ becomes large.

The above time duration $T_{OF}$ when the hold time duration $T_{SET}$ is set to the relatively short constant time value can be constant irrespective of the value of the control release purpose target acceleration/deceleration $G_{OF}{}^*$ when the vehicular velocity V(n) is equal to or below the set vehicular velocity Vo.

It is noted that, although, in each preferred embodiment described above, the velocity feedback equation of the equation (2) and the inter-vehicle distance feedback equation of the equation (3) are described in the case of the P (proportional) control, these equations are not limited to the case described above but PD (Proportional-Differential) control or PID(Proportional-Integration-Differential) control may be applied to these equations.

In addition, although, in each embodiment, the case where the target inter-vehicle distance D* is calculated and the target acceleration/deceleration G* is calculated by comparing the target inter-vehicle distance D* with the actual inter-vehicle distance D, the target vehicular velocity V* (n) may be determined so that the time duration (the inter-vehicle time duration) To for which the vehicle has reached to a distance Lo(m) behind of the preceding vehicle on the basis of the inter-vehicle distance D(n) becomes constant, the engine output command value for the vehicle to be accelerated if the engine output command value is positive, and the target braking pressure may be set through the PD control or PID control on the basis of the velocity deviation $\Delta V$(n) if the engine output command value is negative.

Although, in each preferred embodiment, the alarm unit 21 is constituted by the buzzer, the alarm unit 21 may be constituted by a light emitting diode display unit and the alarm may be issued by a continuous light on or blinking using the display unit.

It is furthermore noted that although, in each preferred embodiment, the vehicular velocity V(n) is derived by the average value of the vehicular road wheel velocities of the driven wheels, the vehicular velocity V(n) may be derived by the detection of an output shaft revolution velocity of the automatic transmission 3 using its corresponding revolution velocity sensor or may alternatively be derived by means of a vehicular body calculator to be applied to an anti-skid braking control system.

It is also noted that although, in each preferred embodiment, the automatic transmission 3 is installed on the output end of the engine 2, the present invention is applicable to the vehicle in which a continuously variable transmission (CVT) is installed on the output end of the engine.

It is also noted that although, in each preferred embodiment, the present invention is applicable to the rear-wheel drive vehicle, the present invention is also applicable to a front-wheel drive vehicle or to a four-wheel drive vehicle In addition, the present invention is further applicable to an electric vehicle in which an electric motor in installed in place of the engine 2 or to a hybrid car in which both of the engine 2 and electric motor are commonly used. In this case, an electric motor drive controller may be applied in place of the engine output controller 9.

The term of moderating means reducing a rate of the target vehicular velocity variation rate with respect to time at a gradient smaller than substantially infinite.

The entire contents of Japanese Patent Application No. Heisei 10-84359 filed Mar. 30, 1998 are herein incorporated by reference.

Although the invention has been described above by reference to certain embodiments of the invention, the present invention is not limited to the embodiments described above. Modifications and variations of the embodiments described above will occur to those skilled in the art in light of the above teachings.

The scope of the present invention is defined with reference to the following items.

What is claimed is:

1. A method applicable to an automotive vehicle, comprising:

detecting an inter-vehicle distance from the vehicle to another vehicle which is running at a detected inter-vehicle distance with respect to the vehicle;

detecting a vehicular velocity of the vehicle;

setting a target vehicular velocity variation rate so that the detected inter-vehicle distance coincides with a target inter-vehicle distance;

effecting a vehicular velocity control such that the vehicle follows up the another vehicle maintaining the inter-vehicle distance to the another vehicle at the target inter-vehicle distance;

effecting the vehicular velocity control such that a vehicular velocity variation rate is maintained at the set target vehicular velocity variation rate;

releasing the vehicular running control effected by a vehicular running controller; and moderating a rate of variation with time in the vehicular velocity variation rate set when releasing the vehicular velocity control, when the detected vehicular velocity becomes lower than a set vehicular velocity above which the vehicular velocity control is effected.

2. A control apparatus for an automotive vehicle, comprising:

actual inter-vehicle distance detecting means for detecting a distance from the vehicle relative to another vehicle which is running ahead in the travel path or the vehicle;

actual vehicular velocity detecting means for detecting a vehicle velocity of the vehicle;

target inter-vehicle setting means for setting a target inter-vehicle distance;

target time rate of change setting means for setting a target time rate of change in vehicle velocity;

time rate of change controlling means for controlling an actual rate of-change in vehicle velocity in such a manner that the vehicle is driven with the target time rate of change in velocity while maintaining the target inter-vehicle distance;

determining means for determining when the actual vehicle velocity falls below a set vehicular velocity and generating a signal;

rate of change decreasing means, responsive to the signal, for decreasing the target time rate of change to take a smaller amount than that of the target time rate of change the vehicle has experienced before said determination.

3. An apparatus for an automotive vehicle, comprising:

an inter-vehicle distance detector for detecting an inter-vehicle distance from the vehicle to another vehicle which is running at a detected inter-vehicle distance with respect to the vehicle;

a vehicular velocity detector for detecting a vehicular velocity of the vehicle:

a target vehicle velocity variation rate setter for setting a target vehicular velocity variation rate so that the detected inter-vehicle distance coincides with a target inter-vehicle distance;

a vehicular running controller for effecting a vehicular velocity control such that the vehicle follows up the another vehicle maintaining the inter-vehicle distance to the another vehicle at the target inter-vehicle distance and that a vehicular velocity variation rate is maintained at the set target vehicular velocity variation rate; and a vehicular running control releaser for releasing the vehicular running control effected by the vehicular running controller and for moderating a rate of variation with time in the vehicular velocity variation rate set when releasing the vehicular velocity control, when the detected vehicular velocity becomes lower than a set vehicular velocity above which the vehicular velocity control by the vehicular running controller in effected.

4. An apparatus for an automotive vehicle as claimed in claim 3, wherein the vehicular running control releaser includes a recovery setter for retaining the target vehicular velocity variation rate set at an instantaneous time when the detected vehicular velocity is decreased and becomes below the set vehicular velocity for a set hold duration in time and, upon an end of the set hold duration in time, for recovering the target vehicular velocity variation rate to zero at a relatively moderate rate of variation with time.

5. An apparatus for an automotive vehicle as claimed in claim 3, further comprising an alarm unit which issues an alarm when the vehicular running control releaser releases the vehicular running control.

6. An apparatus for an automotive vehicle as claimed in claim 5, wherein the vehicular running control releaser includes a recovery setter for retaining the target vehicle velocity variation rate for a set hold duration in time set at an instantaneous time when the detected vehicular velocity is below the set vehicular velocity and, upon an end of the set hold duration in time, for recovering the target vehicular velocity variation rate to zero at a relatively moderate rate and wherein the set hold duration in time is set to a duration in time which is sufficient for the alarm unit to issue the alarm.

7. An apparatus for an automotive vehicle as claimed in claim 5, wherein the vehicular running control releaser includes a recovery setter for retaining the target vehicle velocity variation rate for a set hold duration in time set at an instantaneous time when the detected vehicular velocity is below the set vehicular velocity and wherein the set hold duration in time is set so that an alarm duration in time for which the alarm unit issues the alarm is coincident with a duration in time from a time at which the retaining of the target vehicular velocity variation rate by the recovery setter is started to a time at which the release of the vehicular running control is ended at the recovery of the target vehicular velocity variation rate to zero.

8. An apparatus for an automotive vehicle as claimed in claim 5, wherein the vehicular running control releaser includes a recovery setter for retaining the target vehicle velocity variation rate for a set hold duration in time set at an instantaneous time when the detected vehicular velocity is below the set vehicular velocity and wherein the set hold time duration is set to a variation rate value which corresponds to a duration in time which is sufficient for the alarm unit to issue the alarm.

9. An apparatus for an automotive vehicle as claimed in claim 5, wherein the alarm unit comprises a buzzer which issues a buzzer sound as the alarm.

10. An apparatus for an automotive vehicle as claimed in claim 5, wherein the vehicular running controller comprises a target inter-vehicle distance calculator for calculating the present target inter-vehicle distance $D^*(n)$ using the following equation: $D^*(n)=V(n)\times To + Do$, wherein $V(n)$ denotes the present vehicular velocity, $To$ denotes an inter-vehicle duration in time for which the vehicle has reached to a position $Lo$ meters behind the present other vehicle, and $Do$ denotes the inter-vehicle distance to the other vehicle when the vehicular velocity is zero.

11. An apparatus for an automotive vehicle as claimed in claim 10, wherein the vehicular running controller further comprises a first determinator for determining whether the presently detected inter-vehicle distance $D(n)$ is equal to or below the present target inter-vehicle distance $D^*(n)$ and a target acceleration/deceleration calculator for calculating a target acceleration/deceleration $G_{FB}^*$ using the following equation: $G_{FB}^* = K_A \times (V^* - V(n)) + L_A$, wherein $K_A$ and $L_A$ denote constants and $V^*$ denotes a target vehicular velocity determined on the basis of the detected inter-vehicle distance and the vehicular velocity when D(n)>D*(n) and using the following equation: $G_{FB}^*=K\times(D(n)-D^*(n))-L_B$, wherein $K_B$ and $L_B$ denote constants when $D(n)\leq D^*(n)$.

12. An apparatus for an automotive vehicle as claimed in claim 11, wherein the vehicular running controller further comprises a second determinator for determining whether the present vehicular velocity V(n) is below the set vehicular velocity and a control release flag (FD(n)) status determinator for determining a present status of a control release flag (FD(n)) on the basis of a result of determination by the second determinator.

13. An apparatus for an automotive vehicle as claimed in claim 12, wherein when the present status of the control release flag (FD(n)) is determined to be at a "1", the vehicular running control releaser outputs an alarm output SA to the alarm unit to issue the alarm.

14. An apparatus for an automotive vehicle as claimed in claim 13, wherein the vehicular running control releaser comprises: a third determinator for determining whether a previous status of the control release flag (FD(n)) is at a "0" or "1"; a first setter for setting the calculated target acceleration/deceleration $G_{FB}^*$ to a control release purpose target acceleration/deceleration $G_{OF}^*$ when the present status of the control release flag FD(n) is at a "1" and the previous status of the control release flag (FD(n-1)) is at a "0"; and a timer for counting the set hold duration in time, the timer being set to zero (T=0) and being incremented by one when the present status of the control release flag FD(n) is at a "1" and the previous status of the control release flag (FD(n-1)) is at a "0", wherein the vehicular running controller sets the control release purpose target acceleration/deceleration $G_{OF}^*$ to a target acceleration/deceleration G* and outputs a target braking pressure $P_B^*$ in accordance with the target acceleration/deceleration G* and which further comprises a vehicular braking controller for receiving the target braking pressure $P_B^*$ from the vehicular running controller and for activating a braking pressure of a braking system so as to be coincident with the target braking pressure.

15. An apparatus for an automotive vehicle as claimed in claim 14, wherein the vehicular running control releaser comprises: a fourth determinator for determining whether a count value (T) of the timer is incremented and has reached to a predetermined count value ($T_{SET}$) which corresponds to the set hold duration in time; a fifth determinator for determining the control release purpose target acceleration/deceleration $G_{OF}^*$ as follows: $G_{OF}^*=G_{OF}^*+\Delta G_{CL}$, wherein $\Delta G_{CL}$ denotes a set value of the variation rate of the control release purpose target acceleration/deceleration when T is equal to or above $T_{SET}$; a sixth determinator for determining whether $G_{OF}^*\geq 0$; and a resetter for resetting FD(n) to "0", FD(n-1) to "0"; and SA to a "0" when $G_{OF}^*\geq 0$.

16. An apparatus for an automotive vehicle as claimed in claim 15, wherein the set hold duration in time is fixed to a predetermined value ($T_{SET}$).

17. An apparatus for an automotive vehicle as claimed in claim 15, wherein a duration in time for which the alarm unit issues the alarm is dependent upon a magnitude of the target acceleration/deceleration $G_{Fb}^*$ when the present vehicular velocity V(n) is equal to or below the set vehicular velocity.

18. An apparatus for an automotive vehicle as claimed in claim 15, wherein the vehicular velocity control releaser further comprises a hold duration in time calculator for calculating the set hold duration in time using the following equation: $T_{SET}=T_{OP}-G_{OF}^*/\Delta G_{CL}$, wherein $T_{OF}$ denotes an alarm duration in time required to inform a vehicular driver of the control release of the vehicular running controller by the vehicular velocity control releaser.

19. An apparatus for an automotive vehicle as claimed in claim 15, wherein the increment rate of $\Delta$ GCL of the control release purpose target acceleration/deceleration $G_{OF}^*$ is derived as follows: $\Delta G_{OL}=G_{OF}^*/(T_{OP}-T_{SET})$, wherein $T_{OP}$ denotes $T_{OP}$ denotes an alarm duration in time required to inform a vehicular driver of the control release of the vehicular running controller by the vehicular velocity control releaser.

* * * * *